United States Patent Office 3,035,012

Patented May 15, 1962

1

3,035,012

GRAFT COPOLYMER OF POLYCHLOROPRENE BACKBONE AND 2,3-DICHLOROBUTADIENE-1,3 AND METHOD OF PREPARATION

Rudolph Pariser, Wilmington, and Gilbert T. Perkins, New Castle, Del., assignors to E. I. du Pont de Nemours and Company, Wilmington, Del., a corporation of Delaware No Drawing. Filed Dec. 23, 1958, Ser. No. 782,395

5 Claims. (Cl. 260—45.5)

This invention is directed to synthetic elastomers made from chloroprene and more particularly to elastomers of new type made from chloroprene and 2,3-dichlorobutadiene-1,3.

The elastomeric polymers made from chloroprene may be widely varied in properties by varying the conditions of polymerization and by the use of chain terminating and chain transfer agents (modifying agents) and still more by polymerizing the chloroprene in the presence of other polymerizable monomers. Even after investigating the mixed polymeric compounds of this last type, however, containing a wide variety of second monomers, certain combinations of properties, as hereinafter described, still cannot be obtained. It is obvious that it would be highly desirable to make these desired elastomers from chloroprene and known and readily available monomers by some new polymerization procedure.

Mixed polymeric compounds of new type can sometimes be made by polymerizing a monomer in the presence of a preformed polymeric material. Under some conditions and in the case of certain pairs of monomers and polymers, the monomer apparently can become attached to the preformed polymer and at the same time form the first member of a growing, polymer chain. The result is a mixed polymer, called a graft polymer, in which the polymer chains formed from the monomer are "grafted" onto the preformed polymer, forming a structure different from that of a copolymer made by polymerization of the mixture of monomers and also different from a mechanical mixture of the two polymers; this difference is reflected in important differences in physical properties.

In the case of polychloroprene, however, true graft polymerization takes place only in an extremely small number of cases and only under specific conditions. Thus U.S. Patent 2,356,091 discloses and claims the process of polymerizing methacrylic acid (or its polymerizable derivatives giving methacrylic acid on hydrolysis, such as methyl methacrylate and methacrylic nitrile) in the presence of a polychloroprene which has been made in the presence of sulfur. The graft polymers, however, could be obtained only within this narrow range. If the chloroprene had been polymerized in the presence of any modifying agent other than sulfur or in the absence of modifying agent, it would not add the other monomer. Furthermore, monomers other than methacrylic acid derivatives such as styrene, vinyl acetate, vinyl chloride, vinylidene chloride, methyl vinyl ketone, butadiene, or even acrylic acid derivatives, would not successfully add to the sulfur-modified polychloroprene.

It is an object of the present invention to provide novel elastomer products derived from chloroprene. It is a further object of the present invention to provide novel elastomer products having significant properties and combinations of properties not heretofore obtainable. It is a further object of the present invention to provide new graft copolymers of chloroprene. It is still another object of this invention to provide a process for preparing such novel graft copolymers of chloroprene.

2

These and other objects will become apparent in the following description and claims.

These objects are accomplished by the present invention, in which a novel method for making certain new graft copolymers of chloroprene, as defined, have been discovered. These novel polymers have new and valuable properties and combinations of properties.

More specifically, the present invention is directed to novel elastomeric graft copolymers comprised to the extent of 8 to 70% by weight of units derived exclusively from 2,3-dichlorobutadiene-1,3, the remaining units being derived preponderantly from chloroprene, said copolymers being less than 50% soluble in boiling benzene and having, when cured, a brittle point below —30° C., and, the process of polymerizing 2,3-dichlorobutadiene-1,3 by means of a free-radical catalyst in the presence of a polychloroprene dispersed in water in the form of a latex to produce said novel copolymers.

The polychloroprene may be of any type capable of being formed in aqueous emulsion. Thus it may be "unmodified" and insoluble in organic solvents, or "modified" and soluble in solvents such as benzene (as results from polymerizing in the presence of small amounts of mercaptans, for example), or it may be of the type made in the presence of sulfur, which type is readily plasticized to soluble form by methods well known in the art. The term polychloroprene as used is intended to include normal copolymers of a chloroprene made by polymerizing chloroprene together with a lesser amount of another ethylenically unsaturated monomer copolymerizable therewith, such as styrene, methyl methacrylate, acrylonitrile, and even 2,3-dichlorobutadiene-1,2 itself.

The polymerization initiator or catalyst may be any of the free-radical type, such as organic peroxides and hydroperoxides, per salts (such as ammmonium persulfate), and aliphatic diazo compounds. The free radicals may also be generated from the ingredients of the reaction mass by exposure to high enregy ionizing radiation.

The graft copolymers of the present invention contain from 8 to 70% by weight of units derived exclusively from 2,3-dichlorobutadiene-1,3. Larger proportions of 2,3-dichlorobutadiene-1,3 give products which are harder and have less plasticity, and, when cured, such products have less strength, elongation and resilience. Those products containing less than 8% of the dichlorobutadiene do not reflect the superior features of the product of this invention, such features being exceptionally high resistance to swell by oil, combined with superior tear strength, low brittle point and other significant advantages hereinafter described.

The part of the copolymer molecule which is not exclusively dichlorobutadiene, that is, the original molecules upon which the dichlorobutadiene is grafted, is preponderantly derived from chloroprene; that is, the polymer upon which the dichlorobutadiene is grafted must contain at least 50% chloroprene. When less than 50% chloroprene is present, the product, in general, lacks elastomeric properties. These graft copolymers may be derived from polymers of 100% chloroprene or from the described copolymers of chloroprene to obtain the different effects hereinafter set forth.

Representative examples illustrating the present invention are as follows; parts are by weight unless otherwise described.

EXAMPLE 1

*Graft Copolymerization by Irradiation*

Thirty grams of 2,3-dichlorobutadiene-1,3 is emulsified by stirring in 150 ml. of a polychloroprene latex containing 60 g. of polychloroprene. This latex is obtained by emulsifying and polymerizing the chloroprene in an alkaline sodium resinate solution, in the presence of an aliphatic mercaptan by means of a persulfate polymerization initiator, arresting the polymerization by adding a dispersion of phenothiazine and tertiary butyl catechol as a "short stop" when 70% of the chloroprene is polymerized and removing the unchanged monomer by steam distillation. The resinate solution is made by dissolving the resin, a disproportionated rosin, in the chloroprene and emulsifying the latter in the water phase containing an excess of sodium hydroxide, which forms the sodium resinate dispersing agent. The dispersion of the dichlorobutadiene in the latex is then irradiated under nitrogen with gamma rays from a $Co^{60}$ source. The dosage rate is approximately $4.1 \times 10^5$ roentgen/hr. and the source temperature about 25° C. After 10 min. irradiation, the polymer is isolated by pouring the latex into a mixture of 150 ml. of methanol, 300 ml. of acetone, and 3 ml. of acetic acid and drying the precipitate. The product is plastic, contains 85% of the dichlorobutadiene used (based on chlorine analysis), and is 78% insoluble in refluxing benzene. This indicates that most of the original polychloroprene, which is benzene-soluble even when separately irradiated to the above extent, has combined with the dichlorobutadiene. The properties of the product will be discussed in greater detail in later examples.

Further irradiation of a dispersion of the same composition of dichlorobutadiene in polychloroprene latex for a total of 75 min. increases the conversion of the dichlorobutadiene beyond 90% but the nature of the product was about the same.

EXAMPLE 2

*Polychloroprene/Dichlorobutadiene Ratio 2:1*

Sixty grams of 2,3-dichlorobutadiene-1,3 are emulsified as in Example 1 in 300 ml. of the polychloroprene dispersion used therein, containing 120 g. of polychloroprene. The dispersion is warmed to 375° C. under nitrogen and a 2% water solution of potassium ferricyanide is added slowly with stirring. A temperature rise is observed after 2.5 ml. has been added. The catalyst solution is then added at such a rate that a temperature of 40° C. is maintained and until a temperature rise from the heat of reaction is no longer observed. This requires about 1 ml. of solution. An additional 1.5 ml. is then added, followed by 1 ml. added over the next 30 min. while keeping the temperature 40° C. The reaction is "short-stopped" by adding a dispersion of a mixture of phenothiazine and tertiary butyl catechol. The polymeric product is then isolated by freezing the latex in a thin layer on a rotating refrigerated drum, washing, and drying under vacuum at 50° C. The yield is close to 100%.

The product is 79% insoluble in hot benzene and 75% insoluble in hot ortho-dichlorobenzene. Since poly(2,3-dichlorobutadiene-1,3) itself is insoluble in benzene and completely soluble in ortho-dichlorobenzene, and since the polychloroprene involved is completely soluble in both, the product is largely a cros-linked true graft-copolymer and not a mere physical mixture of the two homopolymers.

The product of Example 2 is compounded with 2 parts of phenyl betanaphthylamine, 0.5 part of stearic acid, 5 parts of zinc oxide, 4 parts of magnesium oxide, and 0.35 part of ethylene thiourea per 100 parts of elastomer and cured for 30 minutes at 153° C. The properties of the resulting cure are given in Table I.

EXAMPLE 3

*Polychloroprene/Dichlorobutadiene Ratio 4:1*

A polymerization is performed in the same manner as described in Example 2 except that the amount of the dichlorobutadiene is 30 instead of 60 g. The conversion of the diene is practically 100% and the resulting grafted product, containing about 20% of the diene, is 73% insoluble in hot benzene and similar in properties to the product of Example 2, as will be brought out in Table I.

EXAMPLE 4

*Polychloroprene/Dichlorobutadiene Ratio 1:1*

A polymerization is performed as in Example 2 except that the amount of the dichlorobutadiene is 120 g. Again, the reaction is almost complete. See Table I for properties.

EXAMPLE 5

*Polychloroprene/Dichlorobutadiene Ratio 1:2*

A polymerization is performed as in Example 2 except that the amount of the dichlorobutadiene is 120 and the amount of polychloroprene latex is 150 ml., giving a ratio of 2 parts dichlorobutadiene to 1 of polychloroprene. The polymerization of the dichlorobutadiene was almost complete. See Table I for properties.

EXAMPLE 6

*Stepwise Addition*

A graft polymerization is carried out, using the procedure of Example 2 but adding the dichlorobutadiene in four equal portions of 30 g. each. Each portion is allowed to polymerize substantially completely, as shown by absence of heat of reaction with fresh catalyst present, before adding the next. The product is 86% insoluble in refluxing benzene, compared with 79% for the product of Example 2, indicating that the former is more highly cross-linked, due to the stepwise addition.

EXAMPLE 7

*Polychloroprene/Dichlorobutadiene Ratio 4:1*

Example 3 is repeated with the only difference that the dichlorobutadiene is incorporated in the polychloroprene latex by first adding 0.2 g. of sodium hydroxide in 10 g. of water and then the dichlorobutadiene containing 1.2 g. of the resin, which forms additional dispersing agent when neutralized by the sodium hydroxide. After adding the phenothiazine and tertiary butyl catechol, the latex is compounded with 5 parts of zinc oxide, 10 of clay, 1.5 of sulfur, 2 of tetraethylthiuram disulfide, 2 of sodium dibutyldithiocarbamate and 2 of phenolic antioxidant, and 1 part of the sodium salt of sulfated methyl oleate per 100 parts of polymer. The properties of dipped films made from this compounded latex are given in Table II. For comparison with this grafted polymer, a copolymer of chloroprene and 2,3-dichlorobutadiene-1,3 in the ratio 4:1 (called 7A in Table II) is made in the same emulsifying and modifying system and at the same temperature with the same catalyst, compounded by the same formula, and tested. Table II also gives the properties of a grafted polymer made from a chloroprene-dichlorobutadiene copolymer (Example 8).

EXAMPLE 8

*Dichlorobutadiene Grafted on a Chloroprene-Dichlorobutadiene Copolymer*

A copolymer of chloroprene and 2,3-dichlorobutadiene-1,3 is made by polymerizing (at 40° C.) 92.5 parts of the first and 7.5 parts of the second, containing 0.01 part of sulfur, 0.1 part of iodoform, dispersed in water containing the sodium salt of disproportionated rosin as emulsifying agent and potassium persulfate as polymerization initiator. When 70% conversion is reached, the polymerization is "short stopped" by adding phenothiazine and tertiary butyl catechol, and the unreacted monomers are removed by steam distillation. To 1000 g. of this latex, containing 362 g. of the copolymer, 1 g. of sodium hydroxide is added, and 158 g. of dichlorobutadiene, containing 6 g. of the rosin, is then dispersed therein, the rosin forming additional dispersing agent. The added dichlorobutadiene is then polymerized by adding potassium ferricyanide as in previous examples. The resulting latex, with the added dichlorobutadiene grafted onto the original copolymer, is compounded and tested as in Example 7. In addition to the good physical properties listed in Table II, the latex films also show exceptionally good wet gel strength.

EXAMPLE 9

*Blend With Excellent Extrusion Properties*

The solid grafted elastomer resulting from Example 2 is blended with a plastic, mercaptan-modified chloroprene copolymer containing 4% of 2,3-dichlorobutadiene-1,3 and a fluid polychloroprene (Brookfield viscosity 1,000,000 centipoises at 50° C.) in the ratio 47:47:6, using a Banbury mill. The blend is then compounded with 4.0 parts of magnesium oxide, 0.5 part of stearic acid, 1.0 part of phenyl betanaphthylamine, 60 parts of medium thermal carbon black, 12.0 parts of process oil, 5.0 parts of zinc oxide, and 0.5 part of ethylene thiourea (per 100 parts of blend) and tested in comparison with the plastic polychloroprene (called 9A in Table III) used in the blend and with a commercial polychloroprene product (called 9B in Table III) having superior extruding properties. When extruded through a test die designed to give an extrudate with a sharp "feather edge," the blend of Example 8 approached the commercial product in ease and speed of extrusion, smoothness of surface, and evenness of the feather edge and was much better in these respects than the plastic polychloroprene from which it was derived. In many physical properties of the compounded stock cured at 307° F. for 30 min., it was about equal or superior to one or both of the other two elastomers as brought out in Table III.

TABLE I

*Effect of Varying Amounts of 2,3-Dichlorobutadiene-1,3-Grafted on Polychloroprene*

| Example | 3 | 2 | 4 | 5 |
|---|---|---|---|---|
| Ratio of polychloroprene to dichlorobutadiene | 4:1 | 2:1 | 1:1 | 1:2 |
| Plasticity of raw polymer (Mooney ML-4) | 116 | ------- | 265 | ------- |
| Tensile strength in lbs./sq. in. | 2,140 | 2,260 | 2,060 | 1,935 |
| Elongation at break in percent | 455 | 465 | 255 | 185 |
| Resilience (Yerzley) in percent | ------- | 64 | ------- | 31 |
| Hardness (Shore) | ------- | 75 | ------- | 95 |
| Solenoid brittle point in °C.[1] | −39 | −36 | −36 | −37 |

[1] Determined by ASTM Method D746.

TABLE II

*Comparison of Film Properties*

| Example | 7 | 7A | 8 |
|---|---|---|---|
| Description | Dichlorobutadiene (20%) grafted on polychloroprene | Copolymer of dichlorobutadiene (20%) and chloroprene | Dichlorobutadiene (30%) grafted on copolymer of dichlorobutadiene and chloroprene |
| Stress at: | | | |
| 100%, lbs./sq. in. | 310 | 145 | 350 |
| 200% | 600 | 195 | 650 |
| 600% | 1,520 | 750 | 1,835 |
| Tensile strength, lbs./sq. in. | 3,830 | 2,855 | 5,280 |
| Elongation in percent | 895 | 860 | 840 |
| Tear strength (Graves) | 295 | 174 | 330 |

TABLE III

*Properties of Blend*

| Example | 9 | 9A | 9B |
|---|---|---|---|
| Description | Blend containing products of 8 and 9A | Plastic chloroprene-dichlorobutadiene copolymer | Commercial |
| Stress at 300%, lbs./sq. in. | 1,325 | 975 | 975 |
| Tensile strength, lbs./sq. in. | 1,800 | 1,925 | 1,525 |
| Elongation at break in percent | 500 | 520 | 450 |
| Compression set (ASTM-B): | | | |
| 70 hrs. at 212° F. | 43.0 | 45.3 | 41.2 |
| 24 hrs. at 32° F. | 73.6 | 29.0 | 56.7 |
| Tear strength (D-470) in lbs./in. | 37.5 | 35.7 | 16.0 |

To summarize the superior properties of the polymers of this invention, Table I shows that, throughout a broad range of dichlorobutadiene contents, the graft polymers have a uniformly low brittle point, close to that of polychloroprene itself (−37° C.) and much lower than that of the ordinary random copolymers of chloroprene and dichlorobutadiene (−13° C. for 55% dichlorobutadiene). Table II shows the superiority of the graft copolymer over the ordinary random copolymer of the same gross composition in tear strength, ordinary tensile strength, and others stress-strain properties. The discussion of Example 9 (see also Table III) shows that the graft polymers of the present invention, when blended with the ordinary types of plastic polychloroprene, greatly improve the properties which are involved in readily getting smooth extrudates corresponding accurately to the shape of the die from which they are extruded. At the same time, the physical properties of the cured extrudates are better in several important respects than those made from a commercial polychloroprene designed for uses involving extrusion. In making compositions with good extrusion properties from the grafted products of the present invention, the other main component may be any polychloroprene of good plasticity. The plasticity of the blend may be further increased by adding minor amounts, up to 20%, of a fluid neoprene. The ratio of the graft polymer to the plastic polymer is usually between 2:1 and 1:2.

Table I also shows the effects of variation in the proportions of dichlorobutadiene in the grafted polymers. As it increases within the limits of the present invention, the plasticity decreases (that is, Mooney and Williams plasticity numbers increase), tensile strength, elongation, and resilience decrease, resilience decreases, and the brittle point remains constant. The preferred proportion of grafted dichlorobutadiene for most purposes is usually between 20 and 50% of the total polymeric material.

As many apparently widely different embodiments of this invention may be made without departing from the spirit and scope thereof, it is to be understood that this invention is not limited to the specific embodiments thereof except as defined in the appended.

The embodiments of the invention in which an exclusive property or privilege is claimed are defined as follows:

1. An elastomeric graft copolymer comprising from 8 to 70% by weight of polymer chain units derived from 2,3-dichlorobutadiene-1,3, which polymer chain units are grafted onto a preformed polymer derived preponderantly from chloroprene by polymerization, said graft copolymer being less than 50% soluble in boiling benzene and having, when cured, a brittle point below −30° C.

2. An elastomeric graft copolymer according to claim 1, said copolymer comprising 20 to 67 parts by weight of polymer chain units derived from 2,3-dichlorobutadiene-1,3 and 80 to 33 parts by weight of said preformed polymer.

3. The process of graft-polymerizing 2,3-dichlorobutadiene-1,3 polymer chain units onto a preformed polymer derived preponderantly from chloroprene by polymerization, which process comprises dispersing, in the presence of a free-radical polymerization catalyst and under a nitrogen atmosphere, from 8 to 70 parts by weight of 2,3-dicholrobutadiene-1,3 in an aqueous latex dispersion of from 92 to 30 parts by weight of a preformed polymer derived preponderantly from chloroprene by polymerization.

4. A process according to claim 3 in which the 2,3-dichlorobutadiene-1,3 is added in four equal portions.

5. A process according to claim 3, said process utilizing from 20 to 67 part by weight of 2,3-dichlorobutadiene-1,3 in an aqueous latex dispersion of from 80 to 33 parts by weight of a preformed polymer derived preponderantly from chloroprene by polymerization.

References Cited in the file of this patent

UNITED STATES PATENTS 1,965,369 Carothers et al. ---------- July 3, 1934